United States Patent
Olsen

(10) Patent No.: US 12,514,239 B2
(45) Date of Patent: Jan. 6, 2026

(54) LURE FOR FISHING

(71) Applicant: Nomad Tackle Pty Ltd, Alderley (AU)

(72) Inventor: Damon Andrew Olsen, Queensland (AU)

(73) Assignee: Nomad Tackle Pty Ltd, Queensland (AU)

( * ) Notice: Subject to any disclaimer, the term of this patent is extended or adjusted under 35 U.S.C. 154(b) by 64 days.

(21) Appl. No.: 18/252,362

(22) PCT Filed: Nov. 4, 2021

(86) PCT No.: PCT/AU2021/051297
§ 371 (c)(1),
(2) Date: May 9, 2023

(87) PCT Pub. No.: WO2022/099352
PCT Pub. Date: May 19, 2022

(65) Prior Publication Data
US 2024/0099282 A1    Mar. 28, 2024

(30) Foreign Application Priority Data
Nov. 10, 2020 (AU) .................................. 2020904095

(51) Int. Cl.
*A01K 85/00* (2006.01)
*A01K 85/16* (2006.01)

(52) U.S. Cl.
CPC .......... *A01K 85/1837* (2022.02); *A01K 85/16* (2013.01)

(58) Field of Classification Search
CPC .... A01K 85/16; A01K 85/18; A01K 85/1803; A01K 85/1813; A01K 85/1817; A01K 85/1837; A01K 85/00; A01K 91/08
(Continued)

(56) References Cited

U.S. PATENT DOCUMENTS 1,295,448 A * 2/1919 Dingwell ............... A01K 91/10
43/42.49
1,492,228 A * 4/1924 Smith .................... A01K 85/16
43/42.48
(Continued)

FOREIGN PATENT DOCUMENTS

JP          2000217470 A     8/2000
KR        20050056854 A     6/2005
WO        2018081852 A1     5/2018

OTHER PUBLICATIONS

International Searching Authority, Written Opinion of the International Searching Authority, International Application No. PCT/AU2021/051297, dated Jan. 24, 2022, AU.
(Continued)

*Primary Examiner* — Monica L Perry
*Assistant Examiner* — Maria E Graber
(74) *Attorney, Agent, or Firm* — Reichel Stohry Dean LLP; Natalie J. Dean

(57) ABSTRACT

A lure for fishing configured to simulate a swimming motion while sinking. A further embodiment relates to a lure for fishing which does not sink vertically, but swims downwards at an angle. The lure may change direction without input from the user. In an embodiment the lure vibrates when being pulled by a user (e.g. using a fishing rod), swims downwards at an angle when under no external force, vibrating while it does so and changes direction when sinking. Various characteristics of the lure may contribute to this behaviour such as the weight and shape.

22 Claims, 2 Drawing Sheets

(58) Field of Classification Search
USPC .......... 43/42.48, 42.45, 42.47, 42.39, 42.26, 43/42.27, 43.13
See application file for complete search history.

(56) References Cited

U.S. PATENT DOCUMENTS

| | | | |
|---|---|---|---|
| 1,892,892 A | | 1/1933 | Jamar |
| 2,583,616 A | | 1/1952 | Waddell |
| 2,644,265 A | | 7/1953 | Stettner |
| 2,847,791 A | * | 8/1958 | Simmons ............... A01K 85/16 43/42.26 |
| 4,667,434 A | | 5/1987 | Newell |
| 6,041,540 A | * | 3/2000 | Potts ...................... A01K 85/00 43/42.47 |
| 7,627,979 B2 | * | 12/2009 | Huddleston ............ A01K 85/00 43/42.22 |
| 8,966,810 B2 | * | 3/2015 | Scott ...................... A01K 85/00 43/42.22 |
| 10,729,114 B2 | * | 8/2020 | St. John ................. A01K 85/00 |
| 11,234,422 B2 | * | 2/2022 | Koppers ................. A01K 85/18 |
| 2005/0126065 A1 | * | 6/2005 | Ishii ....................... A01K 85/16 43/42.24 |
| 2024/0306620 A1 | * | 9/2024 | Peterson ............. A01K 85/1833 |

OTHER PUBLICATIONS

International Searching Authority, International Search Report, International Application No. PCT/AU2021/051297, dated Jan. 24, 2022, AU.

* cited by examiner

LURE FOR FISHING

PRIORITY

The present application is related to, claims the priority benefit of, and is a 35 U.S.C. 371 national stage application of International Patent Application No. PCT/AU2021/051297 filed Nov. 4, 2021, which relates to and claims priority to Australian Patent Application No. 2020904095 filed on Nov. 10, 2020. The content of each of the aforementioned priority applications is hereby expressly incorporated by reference in its entirety into this disclosure.

TECHNICAL FIELD

Embodiments relate to a lure for fishing.

BACKGROUND

Lures used to entice fish come in many different forms. Many lures are intended to imitate bait. Where the bait is other fish, the lures may be shaped and coloured to imitate the fish the intended catch fish prey upon.

However, it has been found that the effectiveness of such lures can be significantly improved if they imitate the behaviour of the bait fish. One of the ways in which that behaviour can be imitated is by simulating the swimming motion of the bait fish.

It is known to provide lures which vibrate when pulled by a user. Such lures simulate a swimming motion, but need the influence of the user's pull to do so. As soon as a user stops pulling, the lure loses any life-like behaviour.

PCT application PCT/AU2017/050662 to this applicant relates to a fishing lure which is primarily intended to be towed, e.g. behind a boat. The attachment between the tow line and the lure is configured in such a way that the lure wriggles through the water in a manner similar to a swimming fish.

SUMMARY OF THE DISCLOSURE

An embodiment provides for lure for fishing configured to simulate a swimming motion while sinking. A further embodiment relates to a lure for fishing which does not sink vertically, but swims downwards at an angle. The lure may change direction without input from the user. In an embodiment the lure vibrates when being pulled by a user (e.g. using a fishing rod), swims downwards at an angle when under no external force, vibrating while it does so and changes direction when sinking.

An embodiment relates to a lure for fishing configured to simulate a swimming motion while sinking, the lure having a body, the body being fish-shaped having a head portion joined to a rear portion, the body defining a dorsal line, a ventral line and two lateral lines located on either side of the body, wherein the dorsal line is convexly curved, the head portion defines a head ventral line which is convexly curved and the rear portion defines a rear ventral line which is concavely curved, the body further comprising a dimple formed in a tail portion, the body further comprising a ballast, wherein the ballast is located in the body so that a majority of a weight of the body is located in a ventral portion of the body such that a shape of the body and a weight distribution of the body are configured to provide the lure with the simulated swimming motion while sinking.

The body of the lure may exclude any attachable accessories such as hooks, lines, external weights or ballast or cosmetic portions such as a flexible tail.

The body may further comprise a tow point, the tow point being provided substantially on the dorsal line. Certain embodiments may simulate a swimming motion when pulled by a user in addition to simulating a swimming motion when sinking. Such embodiments comprise a tow point, often in the form of a loop, provided substantially on the dorsal line. Such a tow point may assist in providing the simulated swimming motion as the user pulls on the lure, e.g. using a fishing rod.

The tow point may be located at a distance between 5% and 60%, preferably 25%-35%, of a length of the lurebody measured backwards from a nose of the body. The tow point may be located and may be on top and centred.

The body may be formed to exclude a lip or bib. Lures which include lips (also referred to as "bibs") are intended for a different use than lures of embodiments. The lip may interfere with the hydrodynamic properties of the lure to such an extent that simulated swimming motion while sinking is not possible.

The body may have a maximum width in an upper half of the body. By providing the maximum width in the upper half of the body it may be possible to provide a lure which simulates a swimming motion when it sinks and when pulled by a user.

The maximum width of the body may apply to all vertical cross-sections so that, for any given vertical cross section of the body taken perpendicular to a length, a maximum width is in an upper half the body. The body may have an overall maximum width which is the greatest maximum width for all vertical cross-sections taken perpendicular to a length.

An overall maximum width of the body may be located at a distance of about 20% to 45%, preferably about 30% to 35%, preferably about 33%, of a total length, measured backwards from the head portion.

An overall maximum width of the body may be located at a distance 15-35% of a distance from the dorsal line to the ventral line, measured down towards the ventral line. The overall maximum width of the body may be located at a distance of about 25% to 30%, preferably about 26%, of a distance from the dorsal line to the ventral line, measured down towards the ventral line of the body.

An overall maximum width of the body may be reached slightly towards the head. In an embodiment, the overall maximum width of the body may be located at a distance of about 7 mm from the top of the body on a lure with maximum depth in the body around 27 mm.

A height of the body may be between 25% to 35% of a length of the body. The length may be measured from the head portion to the tail portion and the height may be measured from the ventral line to the dorsal line.

In cross-section, the body may taper out between the dorsal line and the lateral line, and taper in between the lateral line and a ventral line.

The rear portion may define a dimple. The dimple may define a concave portion of the body having a point of maximum depth close to the corresponding lateral line and to a line of maximum height. The dimple may be located and formed so that, in first cross-section a first dimple line from the lateral line to the ventral line is concave. The first cross-section may be taken from the ventral line to the dorsal line. The dimple may additionally define a second dimple line which, in a second cross-section, is concave between the head portion and the tail portion. The second cross-section may be taken from the head portion to the tail portion.

These curves may be slight so as to also allow the maximum amount of weight to sit inside the body at this location.

The first cross-section may be taken at a location of maximum height. The second cross section may be taken at a location of maximum length.

In an embodiment, the dimple is located behind a gill region of the body. A deepest part of the dimple may be located vertically at max height, but horizontally behind the point of maximum width of the body.

The dimple may be defined by a concave taper in the height. The dimple may be defined by a concave taper in the length.

The dimple may have a horizontal radius measured along the length and a vertical radius measured perpendicular to the length. The horizontal radius may be 40% to 200%, or 60% to 120%, or 70% to 90%, or about 80%, of a length of the body. The vertical radius may be 100% to 400%, or 300% to 380%, or 340% to 360% or about 350%, of the length of the body. In general, having a dimple with large horizontal and vertical radii leaves insufficient space for the internal weight. However, where materials choices render the weight unnecessary or small, the values for the radii may be larger than those provided above.

The lure may have lateral symmetry with two dimples, each as described above, one on either side.

A width at a bottom of the body, measured at a point of maximum height is about 25% to 45%, preferably about 35%, of a maximum local width, measured at the point of maximum height. The width at the bottom of the body may be about 5 mm and the maximum local width may be about 15 mm for a maximum length of the lure of about 80 mm.

A vertical position of the maximum height of the body may correspond to a vertical position where the head ventral line meets the tail ventral line. A vertical position of the maximum height may correspond to a vertical position of a tow point.

The body height at an end of the tail portion may be around 15% to 35%, preferably about 30% of the maximum height of the body. In an embodiment, the relation is 26%.

Where the lure includes a cosmetic portion such as a bifurcated tip or a tail fin, all dimensions and considerations relating to the weight relate to the body and exclude the cosmetic portion as well as any accessories such hooks, lines or external weights which might, in use, be attached to the body. Similar considerations apply in respect of other cosmetic features such as fins or colouring, although colouring or other cosmetic features may be used to indicate a lateral line.

The body may comprise a nose. The body may be shaped so that the nose and a centre line of the tail portion are substantially co-incident.

The body may have maximum height which is between 20% and 40%, preferably 25 to 38, further preferably about 33%, of a maximum length.

The ballast may be shaped to conform to a ventral portion of the lure. The ballast may have a top portion and a bottom portion wherein the bottom portion conforms to the shape of a ventral portion of the lure and the top portion conforms to a shape of an upper part of the lure or is substantially flat.

The entire ballast may be located in a ventral portion of the lure. The entire ballast, excluding a projection into the head region of the lure, may be located in the ventral portion of the lure.

The ballast may have a portion located in a head portion of the lure. The ballast may be located in the ventral portion and the head portion. The portion of the ballast located in the head portion may be located in a region located between 5% and 20%, preferably between 7% and 14%, of a length of the body measured backwards from a nose.

A top of the ballast may be located at a distance less than 75%, preferably between 70% and 40%, and further preferably at about 70% of a maximum height of the body, measured up from the ventral line to the dorsal line. The top of the ballast may exclude any projection, if present.

The location of the ballast may be restricted to an area from the nose to within 60% to 75%, preferably 69% to 72%, of a length of the body measured backwards from the nose.

The weight may be composed of lead, tungsten or other heavy material.

The mass of the weight may be related to the length of the body.

The body is preferably constructed from a hard material such as HDPE, TPE, polycarbonate or a similar material.

An embodiment relates to a lure for fishing which may exhibit a swimming motion when sinking. The swimming motion may comprise a vibration motion of the lure. The vibration motion may comprise a pivot about a longitudinal axis of a body of the lure. The vibration motion may comprise a pivot about a vertical axis of the body. The vibration motion may be exhibited when the lure is lifted by a user.

A ventral line and a dorsal line may move in a range of 20-30% laterally of a vertical axis through the body around a point of maximum depth of the body.

The swimming motion may comprise the lure sinking at an angle from a vertical direction. The angle may be between 10 and 30 degrees.

The swimming motion may comprise changes in direction without input from the user.

It has been found that the swimming motion may be improved when combined with the features of a lure described in PCT application PCT/AU2017/050662 and the contents of this application are hereby incorporated by reference.

DESCRIPTION OF THE DRAWINGS

Embodiments are herein described, with reference to the accompanying drawings in which.

DETAILED DESCRIPTION OF SPECIFIC EMBODIMENTS

Figure 1:
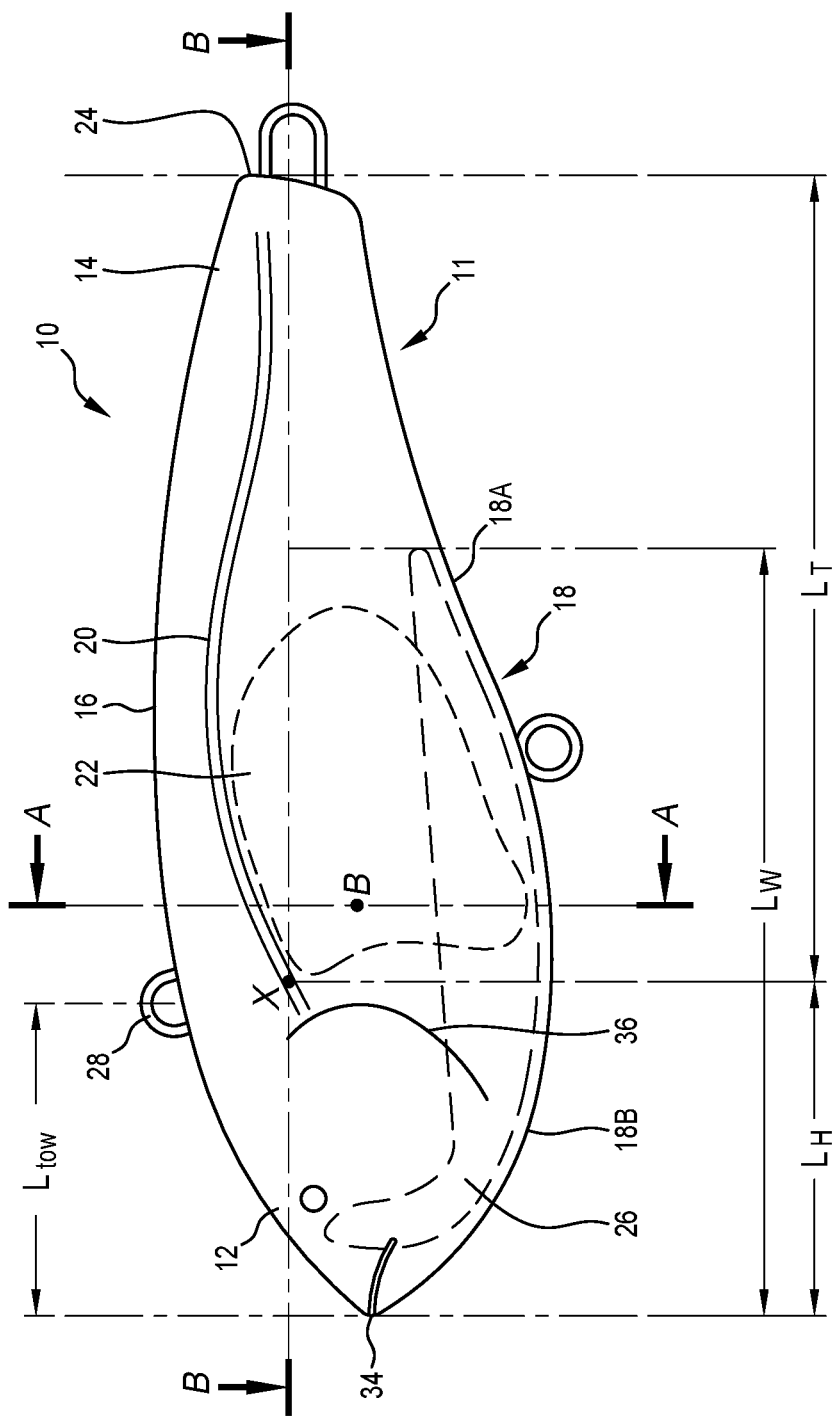
FIG. 1 is a side view of a lure for fishing according to an embodiment.

FIG. 1 illustrates a lure for fishing 10 according to an embodiment. The lure 10 illustrated in FIG. 1 is representative of embodiments of the invention since the simulated swimming motion may be achieved with lures of different sizes, scaled accordingly. Therefore, the dimensions of the body are discussed below in relative terms, and some specific dimensions are set out by way of example. However, it is to be realised that many variations are possible, within the constraints discussed above, and below.

The lure 10 comprises a body 11 which is formed with a head region 12 attached to a tail region 14. Although there is no clear delineation between the head region 12 and the tail region 14, for the sake of convenience the gills 36 are taken as the transition between the head region 12 and the tail region 14. It is to be realised however that the lure 10 is a simulation of a real fish and, as such, need not include formations which correspond to gills. It is merely for the sake of convenience that a region which would correspond to the location of the gills is taken as the transition between the tail region 14 and the head region 12.

The body 11 has a dorsal line 16, a ventral line 18 and a lateral line 20. The ventral line 18 comprises a convex ventral line 18B which extends from a nose 34 of the body and into the tail region 14. The convex ventral line 18B is joined to a concave ventral line 18A which extends over the remainder of the tail region 14.

Figure 2:
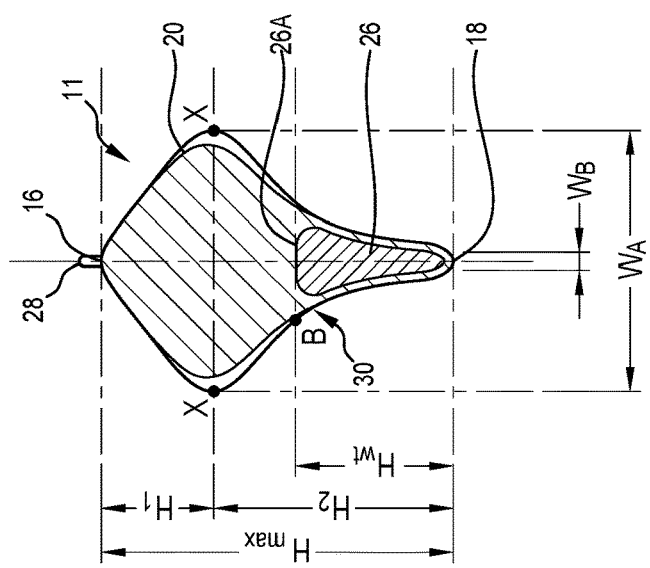
FIG. 2 is a cross-section through the lime A-A of FIG. 1.

The body 11 is formed with a dimple 22 in the tail portion 14. This dimple comprises a hollowed portion defined by concave tapering in both the height and the length. FIG. 2 illustrates a cross-section along the line A-A of FIG. 1. FIG. 2 illustrates a vertical cross-section taken perpendicular to a length of the body 11 and, as shown, the body 11 extends out to the lateral line 20 which is generally formed in the region of maximum width for the vertical cross-section. From the lateral line 20 down to the ventral line 18, the body 11 tapers with a concave profile as shown at 30.

The radius of the concave profile 30, which is a vertical radius of the dimple, is related to the length of the body 11. The radius of the concave profile 30 may be 100% to 400%, or 300% to 380%, or 340% to 360% or about 350%, of the length of the body.

"B" marks the deepest part of the dimple which is located vertically at maximum height, but horizontally behind the point of maximum height. As illustrated in FIG. 1, point B is located in the same vertical dimension as the maximum height, but horizontally behind the point of maximum width.

Figure 3:
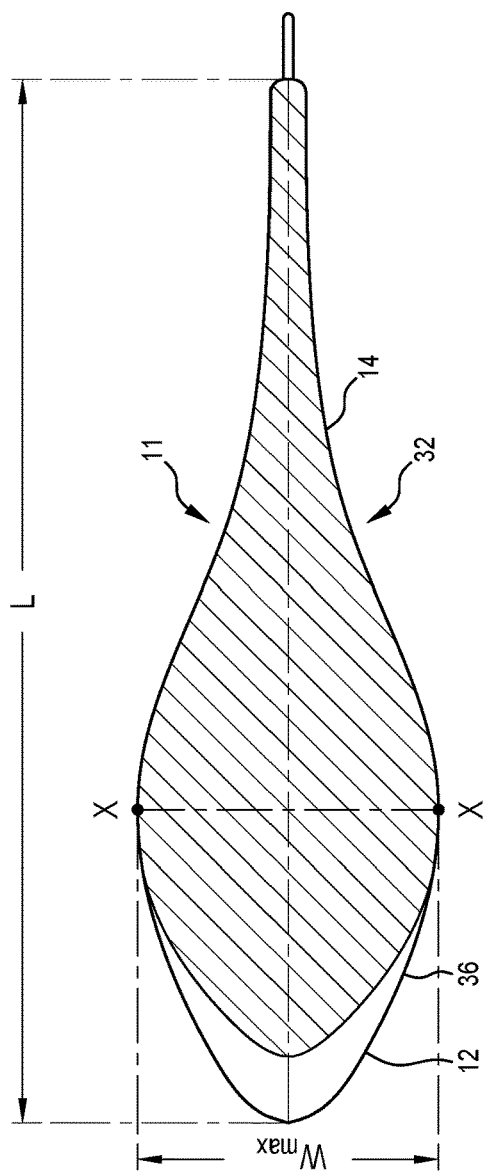
FIG. 3 is a cross-section through the line B-B of FIG. 1.

FIG. 3 is a cross-section along the line B-B and therefore shows a longitudinal cross-section. The area of maximum width is indicated as dimension $W_{MAX}$, but it is to be realised that this maximum width is a local maximum width, specific to this particular cross-section. The tail portion 14 tapers from the area of maximum width down to the end 24 of the tail along concave curve 32.

The radius of the concave profile or curve 32 is the horizontal radius of the dimple and may be 40% to 200%, or 60% to 120%, or 70% to 90%, or about 80%, of a length of the body.

It has been found that providing a dimple may improve the swimming motion of the body, making it look more life-like. It is to be realised that the location and dimension of the dimple depends on the overall dimensions and weight of the body. Although not shown in the accompanying Figures, the body 11 has a lateral symmetry; the other side having the same features shown in FIG. 1.

Furthermore, there are certain aspects to the dimensions of the body which may improve the swimming motion. Certain aspects of the dimensions relate to the point of the body of maximum width. The point of overall maximum width of the body 11 is labelled "X" in FIGS. 1, 2 and 3. Since the vertical cross-sections of FIGS. 2 and 3 are not coincident with this point, the point of maximum width "X" lies outside of the cross-section of the body illustrated in FIGS. 2 and 3, but the illustration is useful in depicting the location of this point relative to the cross-section shown.

At the vertical cross section of FIG. 2, the body 11 has a maximum height $H_{MAX}$ (excluding the tow point and any cosmetic features such as fins). In the embodiment shown, the maximum height does not correspond, in vertical location, to the maximum width. However, in other embodiments, the maximum height and width do occur substantially at the same vertical location (i.e. at substantially the same cross section). Therefore, the width at the location of the maximum height is referred to as a local maximum width.

At the point of maximum height, $H_{MAX}$, the minimum width $W_B$ is about 35% of the maximum width $W_{MAX}$. As shown in FIG. 1, $H_{MAX}$ is vertically in line with the loop 28 which forms the tow point for the body 11. In certain embodiments, having the maximum width in line with the tow point (in the embodiment shown, situated under the loop 28) may improve the simulated swimming motion over other locations.

Similarly, as illustrated, the convex head ventral line 18B meets the concave tail ventral line 18A at a vertical location which generally corresponds to the vertical location of the maximum height $H_{MAX}$ of the lure. This too may contribute to the simulated swimming motion.

As illustrated, the point of maximum width lies on the ventral line 20.

As illustrated in FIG. 2, the point of maximum width "X" is located a distance $H_2$ away from the dorsal line and $H_1$ away from the ventral line. In an embodiment, $H_1$ is 25 to 30% of $H_2$. In an embodiment, $H_1$ is about 7 mm and $H_2$ is about 27 mm which provides a ratio of 26%. This ratio may be maintained for larger or smaller lures.

Furthermore, the point of maximum width "X" is located at a distance $L_H$ from the nose and $L_T$ from the end 24 of the tail. In an embodiment, $L_H$ is about 33% of $L_T$. In the embodiment illustrated, the total length of the lure L (see FIG. 3) is 80 mm so $L_H$ is about 27 mm and $L_T$ is about 53 mm.

The tail portion tapers from the point of maximum height (as shown in FIG. 2) to the end 24 of the tail portion. This taper is due to both the convex dorsal line 16 and the concave portion of the ventral line 18A at the tail portion 14. At the end 24 of the tail portion, the tail has a height $H_T$ which is about 30% of the maximum height. In an embodiment, $H_T$ about 8 mm.

It is to be realised that the tail may be provided with cosmetic features such as a fin or bifurcated portion. Since such features do not add to the function of the lure, they are excluded in any considerations of shape or dimension.

The maximum height $H_{MAX}$ is 25% to 35% of the length L.

In certain embodiments, the weight distribution of the lure may have an effect on the swimming motion. It is to be realised that this may depend on the material out of which the lure is made. However, when the lure is made out of moulded plastics such as HDPE, TPE or a similar material, for example, the lure may include a weight. As illustrated in FIG. 1, the body 11 comprises a weight or ballast 26 which is primarily located in the ventral portion of the lure (i.e. below the lateral line 20).

As shown in FIG. 2, the cross-section of the weight 26 conforms to the shape of the ventral portion of the body 11. In this embodiment, the ballast 26 does not occupy the entire ventral portion (in which case it would extend down from the lateral lines 20). Instead, the top 26A of the ballast 26 is located a vertical distance $H_{WT}$ from the ventral line 18, at a point of maximum height, of the body 11.

In embodiments, $H_{WT}$ is about 70% of the maximum height of the lure, or 19 mm for the specific embodiment illustrated. As mentioned, the simulated swimming motion of the lure is dependent on an interaction between the shape of the lure and its weight distribution. Therefore, the location of the ballast may vary significantly, but $H_{WT}$ is generally below 75% and more than 40%, of the maximum height.

The top 26A of the ballast may not be horizontal or may not be planar, in which case, $H_{WT}$ is taken as the average vertical height above the ventral line 18, at a point of maximum height.

As shown in FIG. 1, the ballast has an extension 34 which extends up into the head portion 12. The portion of the weight located in the head portion may be located in a region located between 7% and 14% of a length of the lure measured backwards from a nose. In other words, the projection may extend across the region delimited by these lengths measured backwards from the nose.

It is to be realised that there may be a relation between the weight distribution and the shape of the lure. So, in certain embodiments, it has been found that the projection of the ballast into the head portion may not be necessary. For example, it has been found that a lure comprised of a soft plastic may not require such a projection to exhibit the simulated swimming motion as a hard plastics lure with such a projection. However, it is to be realised that this may depend on the type of plastics used, as well as the specific shape and dimensions of the lure. In further embodiments, a projection to the ballast is provided with a lure composed of soft plastic.

The weight 26 includes a rear portion 38 which is located a distance $L_W$ from the nose 34. In an embodiment, the distance $L_W$ is about 70% of the total length of the body 11 L. In further embodiments, the distance $L_W$ is between 60% to 75%, and in certain embodiments, 69% to 72% of the length L. The weight in this embodiment is made from lead, but it is to be realised that other heavy materials such as other metals (e.g. tungsten) may be used instead.

The body 11 comprises a tow point 28 in the form of a loop provided on the dorsal line. A centre point of the loop is located a distance $L_{TOW}$ from the nose 34. $L_{TOW}$ is at about 33% of a length of the lure L. A large variation in this distance is possible; it may vary between 5% and 60%, or in further embodiments 25%-35%, of a length of the lure.

Furthermore, the cross-section of FIG. 3, taken along line B-B is taken at a mid-point of the end 24 of the tail portion 14. The nose 24 is situated close to this vertical location so that the nose and the mid-point of the end of the tail portion are substantially coincident.

The overall length of the lure, L may be 75, 95, 110, 130, 150 mm, but it is to be realised that embodiments with other lengths would operate as intended too.

Generally, lures according to embodiments simulate a swimming motion. The simulated swimming motion may occur when the lure is sinking and/or when the lure is being pulled by a user either using a rod or when the lure is being towed. The swimming motion comprises a vibration and/or changes in direction. The vibration is a vibration about a vertical and/or a horizontal axis. It has been found that this simulated swimming motion may make the lure appear more life-like and may therefore attract more fish than conventional lures.

Different types of simulated motion are possible, but it has been found that certain embodiments display a vibration in the range of 20-30% laterally of a vertical axis through the body around a point of maximum depth of the body.

In the accompanying figures, the lure 10 is illustrated without many of the cosmetic features and accessories which may be incorporated in use. Some of these features such as flexible tails may be incorporated into the lure during manufacture, whereas others such as hooks, lines and external ballast or weights may be added by a user. However, it is to be realised that the aforementioned discussions of features, dimensions and weights of the body exclude any such cosmetic features or accessories.

PCT application PCT/AU2017/050662 describes a system referred to as an 'auto-tuning' system. The tow point is a loop formed in a plate which is secured in a grove by two transverse pins. The plate thereby provided with restricted pivoting motion in the horizontal and vertical planes, as well as being permitted a limited amount of lateral movement within the groove. It has been found that this system may work well with embodiments described herein. Without wishing to be bound by theory, the inventors theorise that the additional freedom from the tow line afforded by the auto-tune system may help to contribute to the simulated swimming motion of the lure.

Therefore, further embodiments incorporate the tow point and attachments described in PCT application PCT/AU2017/050662 and the contents of the corresponding published specification of that application are incorporated by reference.

It is to be understood that, if any prior art publication is referred to herein, such reference does not constitute an admission that the publication forms a part of the common general knowledge in the art, in Australia or any other country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments. Similarly, the word "device" is used in a broad sense and is intended to cover the constituent parts provided as an integral whole as well as an instantiation where one or more of the constituent parts are provided separate to one another.

REFERENCE NUMBERS

10 Lure
12 Head portion
14 Tail portion
16 Dorsal line
18 Ventral line
18A Head ventral line
18b Tail ventral line
20 Lateral line
22 Dimple
24 Tail end
26 Ballast
28 Tow/line attachment loop
30 Concave taper in height
32 Concave taper in length
34 Nose
36 Gills
38 Rear portion of weight.
H Height
L Length
$W_B$ Bottom width
$W_{MAX}$ Maximum width
$L_H$ Length portion including head
$L_T$ Length portion including tail
$L_{TOW}$ Length from nose to middle of tow point
$H_1$ Height to dorsal line at max. width
$H_2$ Height to ventral line at max. width

The invention claimed is:

1. A lure for fishing configured to simulate a swimming motion while sinking, the lure having:

a body, the body having a head portion joined to a rear portion, the body defining a dorsal line, a ventral line and two lateral lines located on either side of the body, wherein the dorsal line is continuously convexly curved through a terminal end of a tail portion, the head portion defines a head ventral line which is convexly curved and the rear portion defines a rear ventral line which is concavely curved, the body further comprising a dimple formed in the tail portion, the body further comprising a ballast, wherein the ballast is located in the body so that a majority of a weight of the body is located in a ventral portion of the body such that a shape of the body and a weight distribution of the body are configured to provide the lure with the simulated swimming motion while sinking, and the tail portion tapers from an area of maximum height and width down to the terminal end of the tail portion, wherein the tail portion has a maximum cross-sectional dimension which is less than a minimum cross-sectional dimension of the body.

2. The lure according to claim 1 wherein the body comprises a tow point, the tow point being provided substantially on the dorsal line.

3. The lure according to claim 1 wherein the body is formed without a lip.

4. The lure according to 1 wherein the body has a maximum width in an upper half of the body.

5. The lure according to claim 1 wherein an overall maximum width of the body is located at a distance of 20% to 40% of a total length of the body, measured backwards from the head portion.

6. The lure according to claim 1 wherein an overall maximum width of the body is located at a distance 15-35% of a distance from the dorsal line to the ventral line, measured down towards the ventral line.

7. The lure according to claim 1 wherein a maximum height of the body is between 25% to 35% of a total length of the body.

8. The lure according to claim 1 wherein, in cross-section, the body tapers out between the dorsal line and each lateral line, and tapers in between each lateral line and the ventral line.

9. The lure according to claim 1 wherein a width at a bottom of the body, measured at a point of maximum height is 25% to 45%, of a maximum local width, measured at the point of maximum height.

10. The lure according to claim 1 wherein a body height at an end of the tail portion is 30% of the maximum height of the body.

11. The lure according to claim 1 wherein the body comprises a nose wherein the body is shaped so that the nose and a centre line of the tail portion are substantially coincident.

12. The lure according to claim 1 wherein a maximum height of the body is between 20% and 40% of a maximum length of the body.

13. The lure according to claim 1 wherein a portion of the weight located in the head portion is located in a region located between 5% and 20% of a length of the lure measured backwards from a nose.

14. The lure according to claim 1 further configured to simulate a swimming motion when the lure is lifted by a user.

15. The lure according to claim 1 wherein the swimming motion comprises the lure sinking at an angle from a vertical direction.

16. The lure according to claim 1, wherein the body is constructed from a hard material.

17. The lure according to claim 1 wherein:
the dimple defines a concave portion of the body having a point of maximum depth adjacent to the corresponding lateral line and to a line of maximum height; and/or
the dimple is located and formed so that, in a first cross-section a first dimple line from the lateral line to the ventral line is concave, the first cross-section being taken from the ventral line to the dorsal line.

18. The lure according to claim 17 wherein the dimple defines a second dimple line which, in a second cross-section, is concave between the head portion and the tail portion, the second cross-section being taken from the head portion to the tail portion.

19. The lure according to claim 1 wherein the ballast is shaped to conform to a ventral portion of the body and/or has a portion thereof located in a head portion of the body.

20. The lure according to claim 19 wherein a location of the weight is restricted to an area within 60% to 75% of a length of the lure measured backwards from a nose.

21. The lure according to claim 1 wherein the swimming motion comprises a vibration motion of the lure.

22. The lure according to claim 21 wherein the vibration motion comprises a pivot about a longitudinal axis and a pivot about a vertical axis.

* * * * *